Dec. 3, 1929.   J. B. DAVIS   1,737,996
LIQUID DISPENSING APPARATUS
Filed July 26, 1926   2 Sheets-Sheet 1
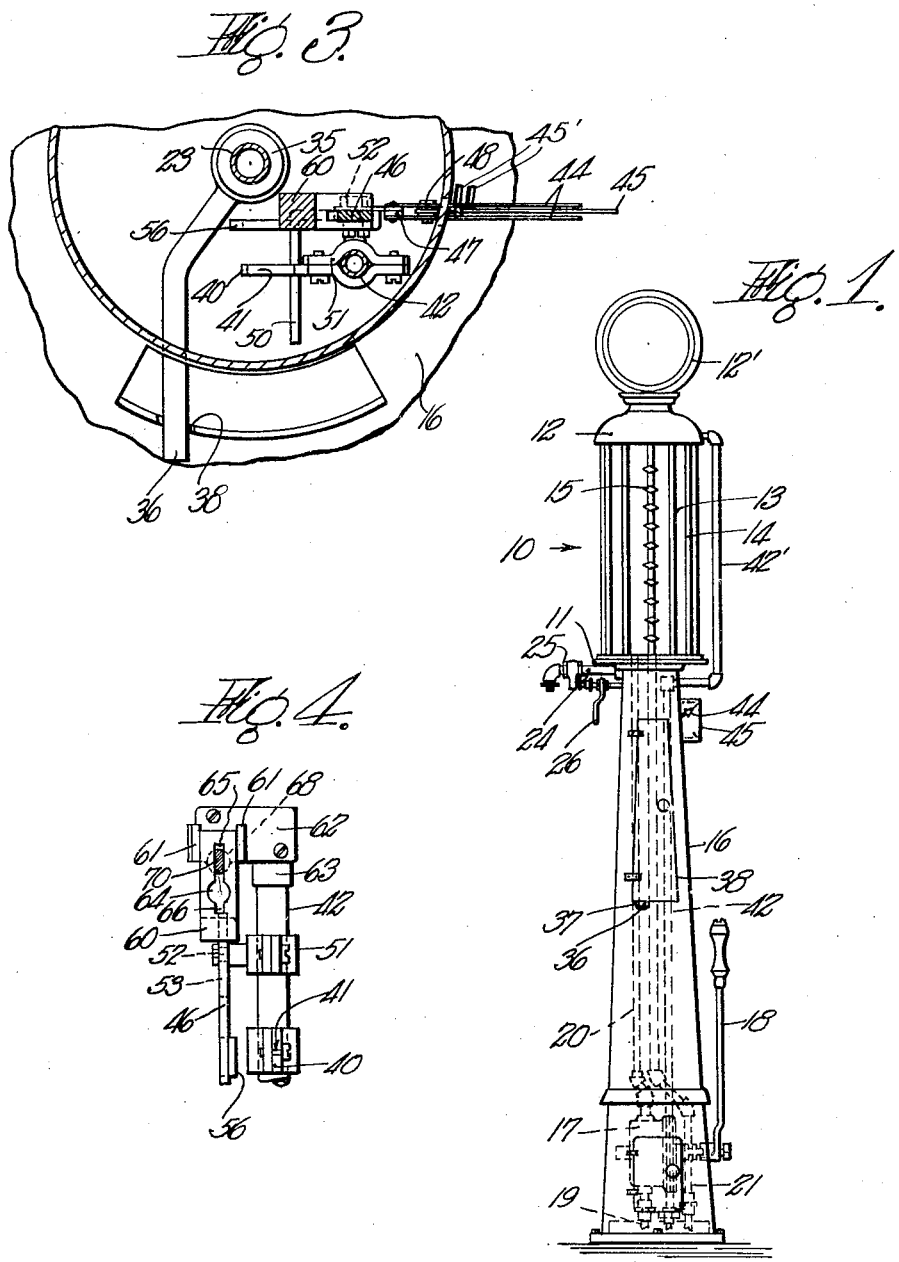

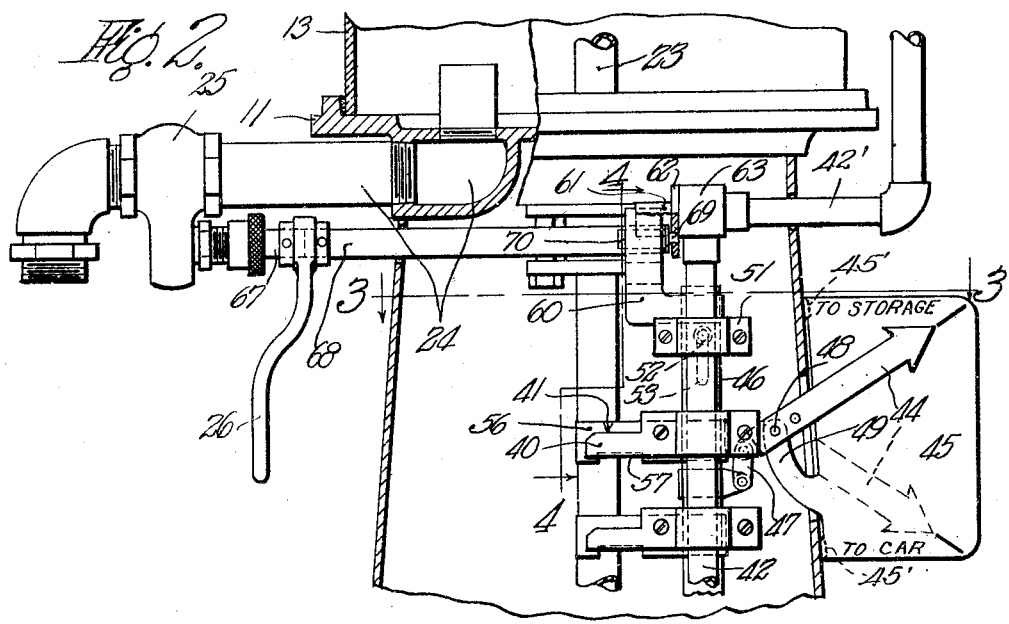

Patented Dec. 3, 1929

1,737,996

UNITED STATES PATENT OFFICE

JOHN E. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed July 26, 1926. Serial No. 124,985.

This invention relates to improvements in liquid dispensing apparatus, such for example, as is commonly used for dispensing gasoline, oil and the like.

The invention, while capable of other uses, is especially useful in connection with that type of liquid dispensing apparatus in which a gage tube is movable to various predetermined levels in a measuring receptacle, whereby to set the apparatus for the discharge of various measured quantities therefrom. This gage tube, once set to gage the receptacle for the discharge of a particular measured quantity, should remain so set until the customer receives that quantity. Occasional instances have been found where a dishonest operator will move the gage tube, during the delivery of the measured quantity, to cheat the customer. The latter can very readily be cheated in this fashion, especially where the gage tube functions as an overflow pipe to conduct the excess liquid from the measuring receptacle to the supply tank, because by lowering the tube during delivery of gasoline to the car, part of the measured quantity in the receptacle can be diverted back to the supply tank.

The invention has for an object the provision of means which will prevent, or at least as a practical matter discourage, the operator from improperly manipulating the gage tube to cheat the customer.

The invention has for another object the provision of means which will indicate to the customer, and enable him to easily ascertain at all times, whether the gage tube is properly set to deliver gasoline to his car or whether it is so arranged as to be capable of being moved to return liquid from the measuring receptacle to the storage tank.

Other objects and advantages will appear in the following description and will be particularly pointed out in the appended claims.

The invention will be disclosed with reference to the accompanying drawings, in which:—

Fig. 1 is an exterior elevational view of a liquid dispensing apparatus embodying the invention drawn to a small scale;

Fig. 2 is a fragmentary sectional elevational view thereof drawn to a larger scale;

Fig. 3 is a fragmentary sectional plan view taken on the line 3—3 of Fig. 2; and Fig. 4 is a fragmentary cross sectional view taken on the line 4—4 of Fig. 2.

The liquid dispensing apparatus, chosen by way of illustrative example as a background for this invention, is of the so-called visible measuring type. It includes a measuring receptacle 10 having a base 11, a cap 12 and a transparent cylindrical wall 13 disposed therebetween and held in place by tie bolts 14. Suitable quantity indicators 15 are provided adjacent glass 13 to define the levels occupied by various measured unit quantities of liquid in the receptacle. The base 11 is supported on the upper end of a hollow casing 16. The lower part of this casing houses a suitable pump 17,—that illustrated being of the wing piston type oscillatable manually by a lever 18. A pipe 19 is adapted to connect the inlet of the pump 17 to the supply tank and a pipe 20 connects the outlet of the pump to the receptacle 10. A pipe 21 extends from the supply tank upwardly into the casing and terminates with a suitable stuffing box 22. An adjustable overflow pipe 23 in receptacle 10 extends downwardly into the casing and has its lower end telescoped into pipe 21 and slidably and rotatably engaged by the stuffing box 22. The receptacle 10 is provided with a delivery passage 24 controlled by a delivery valve 25, adapted to be manually opened by a lever 26. The operator, by oscillating handle 18, operates the pump and forces liquid into receptacle 10. By vertical adjustment of the overflow pipe or gage tube 23, any excess over the quantity desired by the purchaser is drained back to the supply tank, after which lever 26 is operated to open valve 25, whereby the desired measured quantity is delivered, by gravity flow, from receptacle 10 to the customer's car.

Referring to Figs. 2 and 3, the slidable gage tube 23 has fixed thereto a collar 35, to which is attached handle 36, extending horizontally outward. Handle 36 normally extends out of the casing 16 through a recess 37 (Fig. 1) formed therein adjacent a door 38. When this door is opened, handle 36 may be moved out of recess 37 into the door opening and lifted to set the gage tube at any of a number of predetermined levels. For the purpose of holding the tube at such levels, a plurality of stop fingers 40 are provided, each of which has an upper, horizontal, gaging surface 41 upon which handle 36 is adapted to rest. These fingers are secured, preferably in an adjustable manner, as indicated, to a vertical pipe 42, which is suitably supported by means not shown and incidentally serves as a conduit for electric wires leading to the illuminated dome 12' on cap 12. A transverse frame 43, fixed at its edges to casing 16, serves to guide the upper end of the overflow pipe 21.

One feature of this invention is an indicator herein shown by way of illustrative example, as a pair of arrows 44, which are connected to move in unison and straddle a plate 45, secured by lugs 45' to casing 16 and disposed outside the latter in the plain view of the customer. These arrows play over front and rear faces of plate 45 and, pointing to indicia on said plate, apprise the customer as to whether or not the apparatus is properly set to deliver the desired measured quantity to his car. As shown, the plate 45 is marked (preferably on both faces) with upper and lower signs which read "To storage" and "To car" respectively. The arrows 44 are biased with a tendency to point to the upper signs and always give the indication "To storage" except when the handle 36 is engaged with the surface 41 of some one of the several quantity stops 40. The arrows function cooperatively with each of the several stops and are made to move from the position shown in full lines to that shown in dotted lines in Fig. 2 by the cooperation of engaging handle 36 with any one of the stops 40.

To effect this result an operating slide 46 is mounted for limited vertical sliding movement in a path parallel to that in which the gage tube 23 moves and this slide is suitably connected, as by a link 47, to move the arrows 44. The latter are pivoted at 48 to a bracket 49 formed as an extension of plate 45 and extending inwardly into casing 16. The slide 46 is suitably supported near its upper and lower ends for vertical sliding movement, as from brackets 51 which are secured to pipe 42, and carry studs 52 which pass through slots 53 in the slide. The confines of slots 53 limit the vertical movement of slide 46. Near the lower end of slide 46, a handle 50 is fixed thereto and a spring 54, which connects the handle to a bracket 55 fixed to pipe 42, normally holds the slide in its lowermost position, wherein the studs 52 abut the upper ends of slots 53. Attached to slide 46 are a plurality of fingers 56, one for each of the stops 40, and each finger is so arranged with relation to its stop that handle 36 cannot be engaged with the gaging surface 41 of its stop without first moving the finger out of the way. The lower edge of each finger 56 lies in a horizontal plane below the horizontal plane in which the adjacent surface 41 lies so that the handle 36 cannot enter between these edges. The fingers thus form obstructions in the transverse path of movement of handle 36 to any of the several stops. Each finger, may as shown, project laterally beyond its stops so that the handle 36 can be moved in under it and then lifted to raise the finger sufficiently so that handle 36 can be swung laterally into place on the surface 41 of its stop. Any of the several fingers, when thus lifted, will cause slide 46 to be raised enough to tilt the arrows 44 downwardly to their dotted line position and thereby give to the customer an indication that the apparatus is properly set to deliver gasoline to his car. Should this setting be disturbed, the slide 46 will be pulled downwardly to raise the arrows and warn the customer because the disengagement of handle 36 with its stop releases the adjacent finger 56 and allows spring 54 to operate the arrows to give the warning indication. It is also to be noted that, although the handle 36 might be rested on the upper edge of a finger 56, to do so would be useless for the fingers 56 cannot be pressed down and consequently the arrow indicator would still remain pointing to the warning sign "To storage".

Preferably, and primarily for use in connection with the interlocking of the discharge valve with the arrow indicator, as will later appear, each finger 56 has a notch 57 in its lower edge which notch is adapted to fit over the handle 36 when engaged with a stop 40 and prevent the handle from being moved laterally out of engagement with the gaging surface 41 thereof. To release the handle 36, the finger 56 must first be lifted enough to withdraw the notch 57 from handle 36 before the latter can be moved laterally. The handle 50, above described, is provided solely for the purpose of lifting slide 46, and thus fingers 56, in order to release handle 36 in the manner described. The interlocking connections, above alluded to, prevent, or at least render very difficult any improper manipulation of slide 46 by handle 50 but, when these interlocking connections are not used the handle 50 might be improperly used and accordingly it, as well as the notches 57, should be omitted in such case.

For the purpose of interlocking the discharge valve and slide 46, the latter has fixed thereto at its upper end an angle shaped piece 60. The vertical leg of this piece 60 slides between a pair of guides 61 formed as a part of a plate 62. The pipe 42, which serves as a conduit for electric wires leading to dome 12', has a condulet fitting 63 capping its upper end and connecting with a conduit 42'. The plate 62 is applied to said fitting 63 in lieu of the cover plate usually furnished therewith. The vertical leg of piece 60 has a hole 64 and slots 65 and 66 extending therethrough. The slots 65 and 66 intersect the hole 64 and the center lines of the slots are coincident and pass through the center of hole 64. The upper slot 65 is considerably longer than the lower slot for a reason later to appear. The operating lever 26 for the discharge valve 25 normally operates a short rock shaft 67 but in this case it serves also as a coupling to connect shaft 67 with a shaft 68 which turns therewith and is alined therewith. Shaft 68 extends into casing 16 through piece 60, and at its remote end is turned down, as at 69, and this small end 69 has a bearing in plate 62. Adjacent such end, shaft 68 is milled off to form a flat part 70 of substantially rectangular cross section. At least, the sides of this part 70 are parallel and the thickness of the part is such as to closely fit the slots 65 or 66 while its width is such as to freely turn but closely fit hole 64.

The hole 64 is so located with relation to piece 60 and the connected slide 46 that, when the handle 36 lies on the gaging surface 41 of any of the several stops 40 and is engaged in the notch 57 of an overlying finger 56, it will be exactly alined with shaft 68, whereby the latter can turn freely in hole 64 and thus the handle 26 can be turned to open the discharge valve 25. The handle 26, having been thus turned, the part 70 of shaft 68 lies crosswise of the center line of slots 65 and 66 and thus prevents movement of slide 46 and its connected fingers 56. The latter, due to the notches 57, prevent lateral movement of handle 36 and vertical movement thereof being prevented as described handle 36 is held locked to the selected quantity stop and cannot be moved during the delivery of gasoline to the car. Except, when slide 46 is moved to exactly the right elevation the discharge valve cannot be opened because the flat part 70 of shaft 68 will ride in slots 65 or 66. While it is possible for the operator to lift slide 46 by means of handle 50 to the exact level necessary to permit shaft 68 to register with hole 64, this would be very difficult as a practical matter. The operator would have to reach down into the door opening and grasp handle 50 with one hand and pull upwardly on the same against the tension of the heavy spring 54 and at the same time keep trying to turn handle 26 with his other hand to do which he must reach upwardly. By careful and patient work, the object might be accomplished but not without so much time and effort as to attract the customer's notice and warn him of the attempted trickery.

In operation, when the handle 36 occupies its lowermost and illustrated position, the top of overflow pipe 23 is lowered so far in receptacle 10 that all the contents thereof will drain back to the tank. At other vertical positions of pipe 23 there may or may not be a return flow to the supply tank but so long as the tube is free to slide it can readily be moved to drain some of the contents back to the tank and so, for safety's sake, the indicator is arranged to point to the warning sign "To storage" unless the handle 36 is engaged with some one of the several stops.

To set the pipe 23, handle 36 is lifted vertically to about the desired level; then swung in a transverse path until it underlies the free end of a finger 56 corresponding to the particular stop 40 with which the handle is to be engaged. Then, by lifting the handle the finger will be raised out of obstructing relation with the surface 41 and thereby operate the indicator to point to the sign "To car." If then the handle 36 is swung transversely into place on surface 41, the indicator will remain pointing to the sign "To car" but should the operator, after having caused the indicator to give such an indication, then lower handle 36 without engaging it with surface 41, the spring 54 will move the arrow back to warn the customer.

When one of the fingers 56 is thus lifted by the handle the slide piece 60 is lifted and the walls of slot 65 slide on the flattened part 70 of shaft 68 and hold the latter from turning. The fingers 56, due to notches 57 must be lifted somewhat higher than the positions in which they finally come to rest and, for this reason slot 65 is provided in the slide piece 60. When, however, one of the fingers overlies handle 36 and the latter rests in the notch 57 in the former, the hole 64 is exactly alined with shaft 68, whereby the discharge valve is opened. Once the discharge valve is opened, the setting of the gage tube 23 cannot be changed until the valve is again closed for then and only then is the flattened part 70 moved into position to enter slots 65 and 66. The indicator 44, being connected to the slide 46 is also locked. Thus, the former fraudulent manipulation of the gage tube during the delivery of gasoline to the customer is prevented.

The invention, with respect to the indicator, need not necessarily be used in conjunction with that feature of invention which relates to interlocking with the discharge valve, although the use of the two features conjointly forms the most desirable combination and is preferred. Either feature may, however, be used independently of the other in such a manner that some of the benefits and advantages pointed out herein, will be obtained and when so used is deemed to be within the scope of the invention.

Various changes in the detailed way of carrying out the invention will readily occur to those skilled in the art having for an object the accomplishment of the essential purposes of the invention in forms differing specifically from those herein disclosed. Accordingly, it is desired to have the scope of the invention defined by the appended claims rather than by the foregoing description.

What I claim is:

1. In a liquid dispensing apparatus, a plurality of quantity stops, a movable member adapted to be selectively engaged with any of said stops to set the apparatus for the discharge of various predetermined quantities, and an indicator common to all said stops and movable by the operation of engaging said member with any one thereof to indicate that the apparatus is set for the discharge of some one of said predetermined quantities.

2. In a liquid dispensing apparatus, a visible measuring receptacle, a gage tube movable therein to set the apparatus for the discharge of various predetermined quantities, a plurality of quantity stops, a member on the gage tube adapted to be selectively engaged with any of said stops to hold the gage tube in various positions of adjustment, an indicating device movable from a normal position to a second position and adapted when in the second position to indicate that the apparatus is set for the discharge of some one of said predetermined quantities, and operating means for said device adapted to be engaged and moved by the operation of engaging said member with any one of said several stops and when so moved to move said device from the normal to said second position.

3. In a liquid dispensing apparatus, a visible measuring receptacle, a gage tube movable therein to various predetermined levels to drain off liquid above such levels and leave various measured quantities in said receptacle, a plurality of quantity stops, a member connected with said gage tube and adapted to be selectively engaged with any of said stops to position the gage tube at any of said levels, an indicator movable from one position in which it indicates that the member is engaged with some one of said stops to a second position in which it indicates that the member is disengaged from said stops and capable of being moved to drain said receptacle, and operating means for said indicator normally holding the latter in the last named position but arranged to be engaged and moved by the movement of said member into engagement with any of said stops and when so moved to move the indicator to the first named position.

4. In a liquid dispensing apparatus, a plurality of quantity stops, a movable member adapted to be selectively engaged with any of said stops to set the apparatus for the discharge of various predetermined quantities, an indicator movable from one position to another position and adapted when in the second named position to indicate that said member is engaged with some one of said stops, and operating means for said indicator having a plurality of parts one for each of said stops and each disposed in the path in which said member must move to be engaged with said stop, whereby when said member is moved to engage some one of said stops it may engage some one of said parts and thereby move the indicator to said second named position.

5. In a liquid dispensing apparatus, a plurality of quantity stops, a member movable in a certain path to set the apparatus for the discharge of various predetermined quantities, a device for moving said member in said path from one stop to another, said device movable in a path transverse to the first named path into engaging relation with any one of said stops, an operating slide mounted for limited sliding movement in a path parallel to said first named path, an indicator connected to be moved by said slide from one position to another position and adapted when in the second named position to indicate that said device is engaged with some one of said stops, means normally holding said slide and indicator in the first named position, and a plurality of fingers one for each stop connected to said slide and each so disposed with relation to its stop as to obstruct the movement of said device in its transverse path into engaging relation with such stop, whereby the fingers must be moved out of the path of said device before said device can be engaged with any of said stops, thereby moving said indicator into said second named position.

6. In a liquid dispensing apparatus having a plurality of quantity stops and a discharge valve, a member movable in a certain path to set the apparatus for the discharge of various predetermined quantities, a device for moving said member in said path from one stop to another, said device movable in a path transverse to the first named path into engaging relation with any one of said stops, an operating slide mounted for limited sliding movement in a path parallel to said first named path, means normally holding said slide in a position at one end of its path of sliding movement, a plurality of fingers one for each stop connected to said slide and each so disposed with relation to its stop as to obstruct the movement of said device in its transverse path into engaging relation with such stop, whereby when said fingers are moved out of obstructing relation with the stops, said slide is moved from said position to a second position, and interlocking means between said discharge valve and slide whereby the former cannot be opened until said slide is moved into said second position and whereby said slide cannot thereafter be moved out of said second position until the discharge valve is closed.

7. In a liquid dispensing apparatus having a plurality of quantity stops and a discharge valve, a member movable in a certain path to set the apparatus for the discharge of various predetermined quantities, a device for moving said member in said path from one stop to another, said device movable in a path transverse to the first named path into engaging relation with any one of said stops, an operating slide mounted for limited sliding movement in a path parallel to said first named path, means normally holding said slide in a position at one end of its path of sliding movement, a plurality of fingers one for each stop connected to said slide and each so disposed with relation to its stop as to obstruct the movement of said device in its transverse path into engaging relation with such stop, whereby when said fingers are moved out of obstructing relation with the stops said slide is moved from said position to a second position, each of said fingers being notched to fit over said device and hold the same from moving transversely out of engagement with said stop, and means operable by the opening of the discharge valve to lock said slide in said second position against sliding movement.

In testimony whereof I have affixed my signature.

JOHN B. DAVIS.